United States Patent
Bina et al.

(10) Patent No.: US 7,120,130 B2
(45) Date of Patent: Oct. 10, 2006

(54) SEAMLESS REDUNDANT ECHO CANCELLER REPLACEMENT IN A MULTI-CHANNEL ECHO CANCELLER

(75) Inventors: Bruce M Bina, Plainfield, IL (US); William P DeBruyn, Elk Grove, IL (US); Steven M Sagerian, Plainfield, IL (US); Timothy R Housel, Glendale Heights, IL (US)

(73) Assignee: Tellabs Operations, Inc., Naperville, IL (US)

( * ) Notice: Subject to any disclaimer, the term of this patent is extended or adjusted under 35 U.S.C. 154(b) by 726 days.

(21) Appl. No.: 09/974,748

(22) Filed: Oct. 10, 2001

(65) Prior Publication Data

US 2003/0067888 A1 Apr. 10, 2003

(51) Int. Cl.
*H04B 3/20* (2006.01)
(52) U.S. Cl. ............... 370/286; 379/3; 379/406.01; 370/287
(58) Field of Classification Search ............... 370/286, 370/287, 290; 379/3, 406.01, 9.05, 406.04, 379/406.06
See application file for complete search history.

(56) References Cited

U.S. PATENT DOCUMENTS

| | | | |
|---|---|---|---|
| 5,987,098 A * | 11/1999 | Wintour ..................... 379/3 |
| H001884 H * | 10/2000 | Pruett et al. .......... 379/406.01 |
| 6,266,342 B1 * | 7/2001 | Stacey et al. ............... 370/465 |
| 6,430,162 B1 * | 8/2002 | Reese et al. ................ 370/286 |
| 6,590,961 B1 * | 7/2003 | Gulli et al. ................... 379/9 |
| 6,665,402 B1 * | 12/2003 | Yue et al. ............. 379/406.04 |

* cited by examiner

*Primary Examiner*—Ricky Q. Ngo
*Assistant Examiner*—Nguyen H. Ngo
(74) *Attorney, Agent, or Firm*—Hamilton, Brook, Smith & Reynolds, P.C.

(57) ABSTRACT

An echo cancelling system comprises a system controller for directing inbound and outbound PCM signals to one of two echo canceller modules. The system controller receives status information from the echo cancellers and maintains state information pertaining to the active echo canceller, in order to allow seamless switchover from one echo canceller to the other without interrupting service.

18 Claims, 3 Drawing Sheets

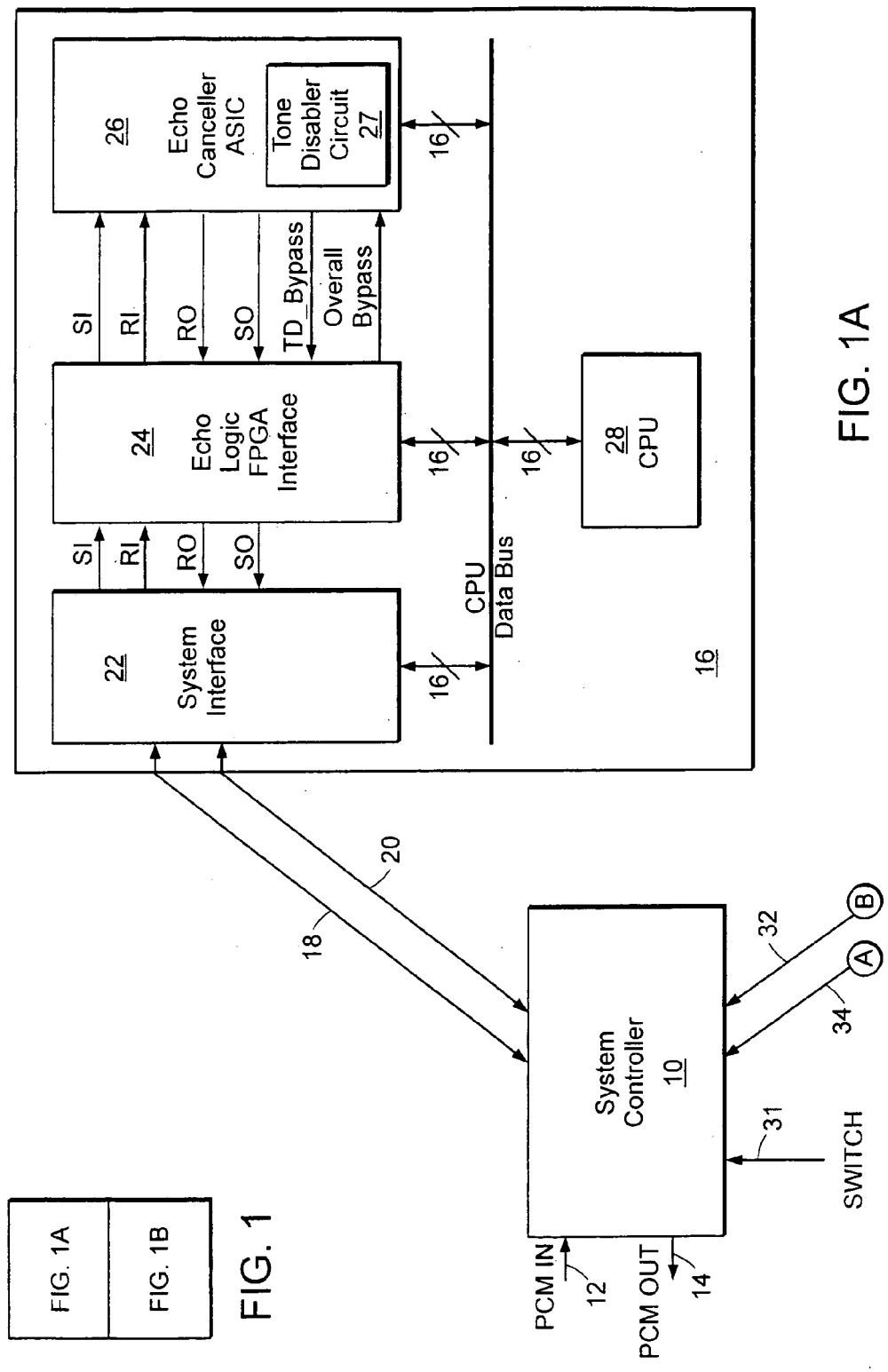

SEAMLESS REDUNDANT ECHO CANCELLER REPLACEMENT IN A MULTI-CHANNEL ECHO CANCELLER

FIELD OF THE INVENTION

The present invention is directed to echo cancellers used in telecommunications systems. In particular, the invention relates to a system for replacing a first multi-channel echo canceller with a second multi-channel echo canceller during operation of the telecommunication system.

BACKGROUND

Echo in telecommunications systems may arise from impedance matches at a four-wire to two-wire hybrid interface, or from an acoustic feedback path at one end of a call. Echo cancellers are essential to long-distance telephonic communication in order to obtain intelligible full-duplex calls. An echo canceller operates by developing an impulse response model of the echo path, and then generating and subtracting an estimated echo signal from an outbound signal on the basis of the impulse response model and the inbound signal. Because an echo canceller alters the outbound telecommunication signal, it is desirable to disable echo cancellation for certain calls, such as data communication calls, and to enable echo cancellation for voice communication calls. One such method of selectively enabling or disabling echo cancellation is to transmit standardized control tones along the telecommunication path. Echo cancellers responsive to such control tones then enable or disable echo cancellation accordingly. In a time-division multiplexed communication system, a single echo canceller module may provide echo cancellation for several channels on a time-division processing basis. Hence, in addition to developing an impulse response model for each of the channels in which echo cancellation is enabled, a multi-channel echo canceller also maintains state information for each channel, indicated whether echo cancellation is enabled.

During the course of operation of a telecommunication system, it may be necessary to take an echo canceller out of active service. For example, an echo canceller may fail, or it may be desirable to upgrade or otherwise service an echo canceller. Because active telephone calls may be in the course of transmission at the time an echo canceller is taken out of service, it is desirable to provide a method in which an active echo canceller may be replaced by another echo canceller without interrupting call transmission. In the case of a multi-channel echo canceller, it would also be desirable for the replacement echo canceller to obtain the current state information indicating the status of echo cancellation for each channel.

SUMMARY

In accordance with the present invention, an apparatus and method for replacing an active echo canceller with a redundant echo canceller during operation of a telecommunication network is provided. The active echo canceller is configured to generate signals indicating the current status of echo cancellation on each of a plurality of telecommunication channels within a multiplexed telecommunication signal. A system controller is connected with the active echo canceller and with the redundant echo canceller. The system controller receives the status signals from the active echo canceller and stores the current state of the active echo canceller. The system controller is further configured to route an inbound telecommunication signal to the active echo canceller and/or to the redundant echo canceller, and to select a processed signal from either echo canceller for outbound transmission thereof. When the system controller operates to switch the outbound signal from the active echo canceller to the redundant echo canceller, the system controller transmits the present status information to the redundant echo canceller in order to place the redundant echo canceller into the same state as the active echo canceller. Then, the system controller switches the output signal of the redundant echo canceller to the outbound telecommunication signal at a subsequent TDM frame edge.

BRIEF DESCRIPTION OF THE DRAWINGS

The foregoing Summary and the following Detailed Description will be best understood in connection with the attached drawings in which.

DETAILED DESCRIPTION

Figure 1B:
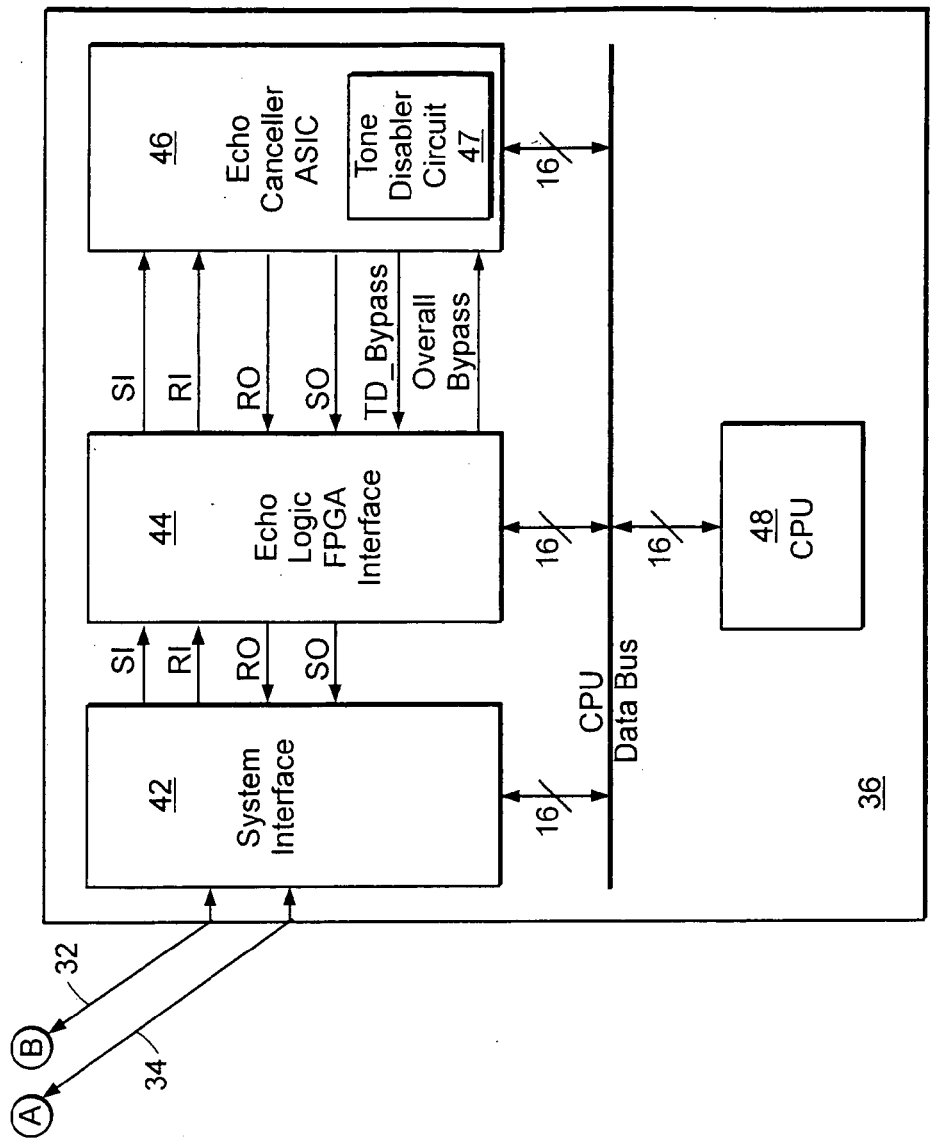
FIG. 1 is a functional block diagram of a system for activating a redundant echo canceller during operation of a primary echo canceller.

Referring now to FIG. 1, there is shown an arrangement for replacing an active echo canceller with a redundant echo canceller. An input telecommunication signal, such as an E1 32-channel PCM multiplexed signal, is received by a system controller 10 along input line 12, and is processed for echo cancellation. The processed signal is transmitted from the system controller 10 along line 14. During normal operation of a primary echo canceller module 16, the system controller 10 routes the inbound PCM signal to the echo canceller module 16 and receives the processed PCM signal from the echo canceller module 16 along line 18. Control signals between the system controller 10 and the echo canceller module 16 are communicated along line 20.

The echo canceller module 16 includes a system interface 22 for receiving and transmitting respective PCM and control signals to and from the system controller 10, an echo logic interface 24, an echo canceller unit 26 implemented as an application-specific integrated circuit (ASIC), and a CPU 28 for coordinating the functions of the echo canceller module 16.

Figure 2:
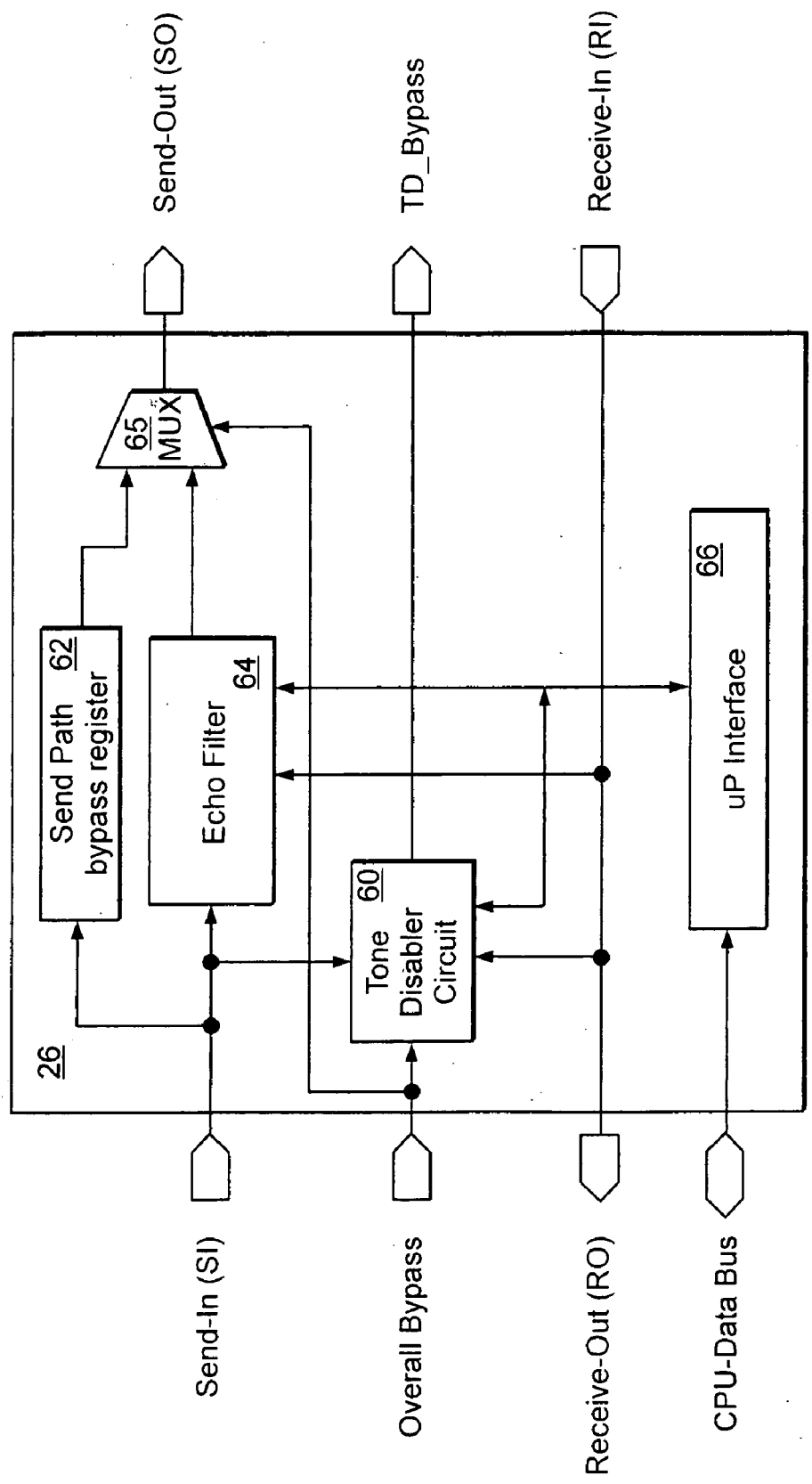
FIG. 2 is a functional block diagram of an echo canceller unit of the system of FIG. 1.

The echo canceller unit 26 is shown in greater detail in FIG. 2. In a preferred embodiment, the echo canceller unit 26 is configured for processing a 32 channel outbound signal, received at send-in terminal SI. The processed signal is provided at send-out terminal SO. The inbound telecommunication signal is received at receive-in terminal RI, and passed to a receive-out terminal RO. A tone-disabler circuit 60 is connected with the RO terminal and is configured for detecting an echo canceller disabling tone in any of the 32 telecommunication channels. The tone-disabler circuit 60 maintains a 32 bit status register for storing the current echo cancellation status (enabled or disabled) for each of the channels. The tone-disabler circuit 60 continuously transmits the contents of its status register as a serial signal via a tone-disable bypass signal terminal (TD_Bypass). Each PCM data channel for which echo cancellation is disabled passes from the SI terminal through a send path bypass register 62 to a multiplexer 65. Each PCM data channel for which echo cancellation is enabled passes from the SI terminal through echo filter 64, and then to multiplexer 65.

The signals provided to multiplexer 65 are arranged in proper time-division sequence, and then provided at the SO terminal. An Overall Bypass terminal is provided for receiving an external serial signal effective to bypass echo cancellation within the echo canceller unit 26. The Overall Bypass signal controls operation of the multiplexer 65 in order to select the unprocessed send-input signal or the echo canceled signal, and to pass the selected signal to the SO terminal.

Referring again to FIG. 1, the echo logic interface 24 is configured to receive the TD_Bypass signal from the echo canceller unit 26 and store the TD_Bypass signal in an internal 32 bit register. The echo logic interface 24 produces the Overall Bypass signal by performing a logical OR upon the received TD_Bypass signal, and an alternative bypass signal generated by CPU 28. The Overall Bypass signal is clocked to the echo canceller unit 26 at the channel time-division rate. In this manner, echo cancellation on each of the channels is determined by the TD_Bypass signal and by the alternative bypass signal, so that the CPU 28 can direct that echo cancellation be disabled on any channel independently of the tone disabler circuit 27 of the echo canceller unit 26.

During operation of the echo canceller module 16, the CPU 28 maintains a record of the echo cancellation status of each channel. Whenever the echo cancellation status of a channel is changed, the CPU 28 transmits a message to the system controller 10, via system interface 22, indicating such a change, so that the system controller 10 maintains an independent record of the present state of echo cancellation on each channel.

The system controller 10 may be configured to detect a fault in the operation of echo canceller module 16 and to replace echo canceller module 16 with a redundant echo canceller 36. Additionally the system controller 10 may perform replacement of the echo canceller module 16 in response to an external signal received along control line 31. The redundant echo canceller module 36 is connected to the system controller 10 via PCM communication line 34 and data communication line 32. The redundant echo canceller module 36 is similarly configured as echo canceller module 16 and includes a system interface 42, an echo logic interface 44, an echo canceller unit 46 that includes a tone-disabler circuit 47, and a CPU 48. When the system controller 10, whether independently or in response to an external control signal, initiates replacement of module 16 with module 36, the system controller 10 maintains transmission of the PCM and control data to the module 16, and begins to transmit the same PCM and control data to module 36 in parallel. This parallel transmission may commence asynchronously with the transmission frame timing of the E1 PCM signal, and allows the module 36 to initialize and stabilize. Additionally, the present status of echo cancellation enablement, as stored by the system controller 10, is transmitted to the redundant module 36 and written into the status register of the echo logic interface 44 of the redundant module 36. At the next frame edge of the E1 PCM signal, or at a subsequent frame edge, the system controller 10 internally switches the outbound PCM signal line 14 to transmit the processed PCM signal from the redundant echo canceller 36. In this manner, the redundant echo canceller 36 is brought into operation having the same echo cancellation status as was present on each channel in the primary echo canceller 16 at the time that a replacement condition was indicated.

It will be appreciated that additional information pertaining to the operation of the primary echo canceller can be monitored by the CPU 28 thereof, transmitted to the system controller 10 during operation, and used to initialize operation of the redundant echo canceller 36. The method described above provides for bringing a redundant echo canceller 36 online while preserving the cancellation status of each channel. In a further adaptation of this method, the CPU 28 of the active echo canceller 16 may be configured to receive other state information from the echo canceller ASIC 26 thereof. For example, the echo canceller ASIC 26 may be configured to perform additional or alternative signal processing operations such as audio enhancement, code conversion, compression, and the like. In such an embodiment, the CPU 28 may monitor and transmit to the system controller 10, the present status of such additional or alternative signal processing operations. Hence, it will be appreciated that echo cancellation, as discussed above, is but one of a variety of signal processing operations that may be performed on the telecommunication signal channels. Furthermore, the CPU 28 of the echo canceller unit 16 may monitor and transmit to the system controller 10 such additional state information as the present state variables defining the impulse response and/or time delay parameters utilized to perform echo cancellation within each channel. In this manner, the redundant echo canceller 36 may be activated and brought online with no adaptation delay required to obtain accurate echo cancellation within each presently operating channel of the telecommunication signal.

That which is claimed is:

1. An apparatus for processing a telecommunication signal, comprising:
   a first signal processor, including a first multi-channel echo canceller, for performing a signal processing function, including echo cancellation, upon a telecommunication signal and for producing a first processed telecommunication signal, in accordance with a signal processing parameter, including a logical signal indicating whether echo cancellation is enabled on each channel, the first multi-channel echo canceller including a tone disabler circuit for detecting the presence of an echo canceller disabling tone within each channel and for producing said logical signal in response thereto;
   a first controller connected with the first multi-channel echo canceller for monitoring the value of the signal processing parameter;
   a system controller connected for receiving the telecommunication signal, the system controller connected with the first multi-channel echo canceller for transmitting the telecommunication signal to the first multi-channel echo canceller and for receiving the value of the signal processing parameter from the first controller, the system controller further connected for receiving the fist processed telecommunication signal from the first multi-channel echo canceller and for transmitting the first processed telecommunication signal as a transmitted signal including a second multi-channel echo canceller;
   a second signal processor, including a second multi-channel echo canceller, for performing the signal processing function upon the telecommunication signal, and for producing a second processed telecommunication signal;
   a second controller connected with the second signal processor for providing the signal processing parameter to the second signal processor;
   the system controller further configured for transmitting the value of the signal processing parameter to the second controller, and for replacing the transmitted signal with the second processed telecommunication signal subsequent to transmitting the value of the signal processing parameter to the second controller.

2. The apparatus of claim 1 wherein said signal processing parameter includes stare variables defining the impulse response for each of the channels in which echo cancellation is enabled.

3. The apparatus of claim 1 wherein said tone disabler circuit is further responsive to an external control signal from the first controller for independently controlling whether echo cancellation is enabled on each channel.

4. The apparatus of claim 1 wherein the logical signal is a function of a first parameter produced by the first multi-channel echo canceller in response to the presence of an echo canceller disabling tone within the telecommunication signal and a second parameter produced by the first controller.

5. The apparatus of claim 4 wherein the logical signal is produced according to a logical "or" function.

6. A method of operating an echo cancelling system, comprising:
    connecting a first multi-channel echo canceller configured to selectively cancel echo in a plurality of telecommunication channels to a multi-channel telecommunication system, the first multi-channel echo canceller further configured to make concurrently available for selection to the plurality of telecommunication channels (i) a plurality of telecommunication signals processed by the first multi-channel echo canceller to produce a plurality of processed telecommunication signals and (ii) a plurality of telecommunication signals unprocessed by the first multi-channel echo canceller;
    monitoring a state condition of echo cancellation, including detecting the presence of an echo canceller disabling tone, in each channel;
    producing a logical signal indicating whether echo cancellation is enable on each channel in response to detecting the presence of an echo canceller disabling tone in each channel;
    indicating the state condition to a system controller;
    transmitting the state condition from the system controller to a redundant multi-channel echo canceller;
    disconnecting the first multi-channel echo canceller from the telecommunication system; and
    connecting the redundant multi-channel echo canceller to the telecommunication system.

7. The method of claim 6 wherein the step of monitoring a state condition comprises monitoring whether the processed telecommunication signal or the telecommunication signal unprocessed by the first echo canceller is output on each of the channels.

8. The method of claim 6 wherein the logical signal is a function of a first parameter produced by the first multi-channel echo canceller in response to the presence of an echo canceller disabling tone within the telecommunication signal and a second parameter produced by the first controller.

9. The method of claim 8 wherein the logical signal is produced according to a logical "or" function.

10. An echo cancellation system comprising:
    a first echo canceller module comprising a first multi-channel echo canceller and a first controller configured for monitoring a state of echo cancellation, including detecting the presence of an echo canceller disabling tone, on each channel,the first controller configured for producing a logical signal indicating where echo cancellation is enabled on each channel in response to detecting the presence of an echo canceller disabling tone, the first echo canceller module configured to make concurrently available for selection to each telecommunication channel (i) a telecommunication signal processed by the first multi-channel echo canceller to produce a processed telecommunication signal and (ii) a telecommunication signal unprocessed by the first multi-channel echo canceller;

a second echo canceller module comprising a second multi-channel echo canceller and a second controller configured for establishing a state of echo cancellation on each channel, the second echo canceller module configured to make concurrently available for selection to each telecommunication channel (i) a telecommunication signal processed by the second multi-channel echo canceller to produce a processed telecommunication signal and (ii) a telecommunication signal unprocessed by the second multi-channel echo canceller; and a system controller configured for selectively connecting the first and second echo multi-channel cancellers to a telecommunication network, the system controller further configured for receiving and recording from the first controller an indication of the echo cancellation state, including the logical signal, on each channel and the transmitting to the second controller the recorded state indication such that the second multi-channel echo canceller is established in operation in accordance with the recorded state information when it is connected by the system controller to the telecommunication network.

11. The echo cancellation system of claim 10 wherein the first controller is configured to monitor the state of echo cancellation as an indicator of whether the processed telecommunication signal or the telecommunication signal unprocessed by the first echo canceller is output on each channel.

12. An apparatus for processing a telecommunication signal, comprising:
    a processor configured to perform a signal processing function upon a telecommunication signal and to produce a processed telecommunication signal;
    a switching unit having simultaneous access to the processed telecommunication signal and the telecommunication signal unprocessed by the signal processing function;
    logic in communication with the switching unit and configured to cause the processed telecommunication signal or the telecommunication signal unprocessed by the signal processing function to be output by the switching unit in a selective manner; and
    a controller in communication with the logic, the controller producing a logical signal that is a function of a first logical signal and a second logical signal produced by the processor in response to an echo canceller disabling tone within the telecommunication signal, the logical signal being used to cause the switching unit to output the processed telecommunication signal or the telecommunication signal unprocessed by the signal processing function.

13. The apparatus of claim 12 wherein the switching unit is a multiplexing switching unit.

14. The apparatus of claim 12 wherein the processor is an echo canceller.

15. The apparatus of claim 12 wherein any one of or any combination of the switching unit, logic, or controller comprises software instructions or is composed of software instructions.

16. The apparatus of claim 12 wherein the logical signal is produced according to a logical "or" function.

17. The apparatus of claim 12 wherein the processor, switching unit, and logic compose a first echo canceller module, and further comprising:
   a second echo canceller module; and
   a system controller coupled to the first and second echo canceller modules, the system controller coordinating operations between the first and second echo canceller modules.

18. The apparatus of claim 17 wherein the system controller passes a parameter between the first and second echo canceller modules the parameter being used to selectively output the processed telecommunication signal or the telecommunication signal unprocessed by the signal processing function.

* * * * *